US006897465B2

(12) United States Patent
Remillard et al.

(10) Patent No.: US 6,897,465 B2
(45) Date of Patent: May 24, 2005

(54) SYSTEM AND METHOD FOR DETERMINING A DISTANCE OF AN OBJECT USING EMITTED LIGHT PULSES

(75) Inventors: Jeffrey Thomas Remillard, Ypsilanti, MI (US); Willes H. Weber, Ann Arbor, MI (US); Allan J. Lippa, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 10/065,579

(22) Filed: Oct. 31, 2002

(65) Prior Publication Data

US 2003/0034462 A1 Feb. 20, 2003

Related U.S. Application Data

(63) Continuation-in-part of application No. 09/598,284, filed on Jun. 22, 2000, now Pat. No. 6,429,429.

(51) Int. Cl.[7] .......................... G01N 21/86; G01V 8/00
(52) U.S. Cl. ................... 250/559.38; 356/5.01
(58) Field of Search ..................... 250/559.38, 559.19, 250/230; 356/5.01, 3

(56) References Cited

U.S. PATENT DOCUMENTS

| 5,434,754 A | * | 7/1995 | Li et al. ................... 362/31 |
| 5,669,174 A | | 9/1997 | Teetzel |
| 5,890,796 A | * | 4/1999 | Marinelli et al. ........... 362/307 |
| 5,949,530 A | | 9/1999 | Wetteborn |
| 5,953,110 A | * | 9/1999 | Burns ................... 356/5.01 |
| 6,279,687 B1 | | 8/2001 | Pustelniak et al. |
| 6,422,713 B1 | | 7/2002 | Fohl et al. |

* cited by examiner

Primary Examiner—Thanh X. Luu
Assistant Examiner—Seung C. Sohn
(74) Attorney, Agent, or Firm—Allan J. Lippa; Bir Law, PLC

(57) ABSTRACT

A system and method for determining a distance of an object is provided. The method includes transmitting a light pulse to a polymeric light reflector at a first time. The method further includes reflecting the light pulse from the reflector. The method further includes receiving a portion of the light pulse reflected from an object at a second time. Finally, the method includes determining a distance of the object from the reflector based on a time difference between substantially the first and second times.

26 Claims, 7 Drawing Sheets

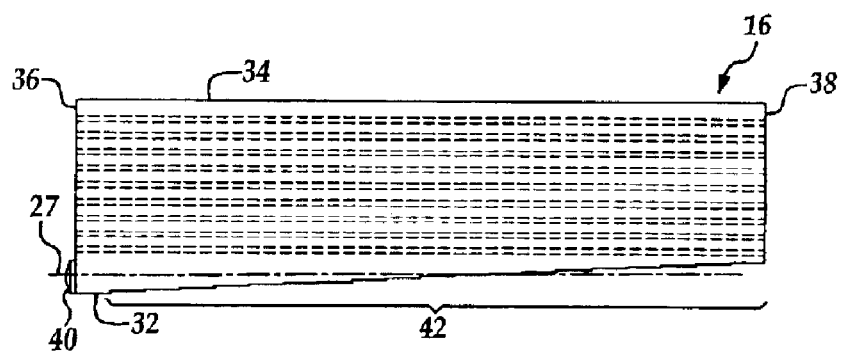
*Figure 3*
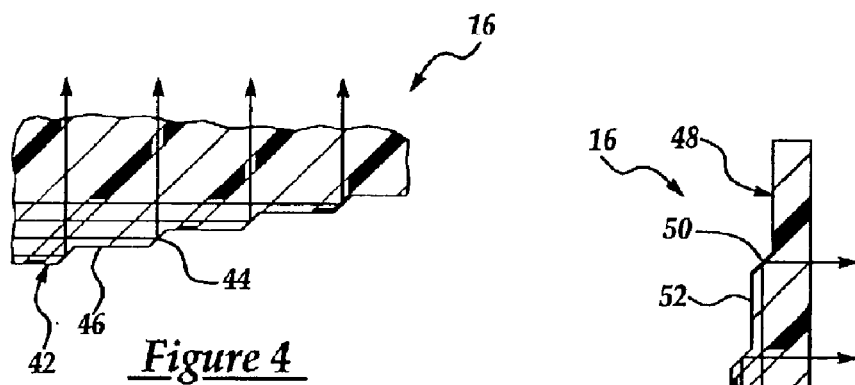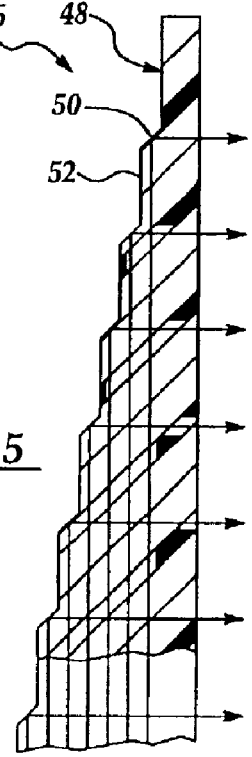
*Figure 4*
*Figure 5*

US 6,897,465 B2

SYSTEM AND METHOD FOR DETERMINING A DISTANCE OF AN OBJECT USING EMITTED LIGHT PULSES

CROSS REFERENCE TO RELATED APPLICATIONS

This application is a Continuation-In-Part of U.S. patent application Ser. No. 09/598,284 entitled NIGHT VISION SYSTEM UTILIZING A DIODE LASER ILLUMINATION MODULE AND A METHOD RELATED THERETO filed Jun. 22, 2000, now U.S. Pat. No. 6,429,429 issued Aug. 6, 2002.

BACKGROUND OF INVENTION

1. Field of the Invention

This invention relates to a system and methods for determining a distance of an object using emitted light pulses.

2. Background of the Invention

A known laser range finding apparatus is disclosed in U.S. Pat. No. 5,669,174. The apparatus utilizes an infrared laser to emit pulses of infrared light along a narrow beam path toward an object. The infrared pulses are reflected from the object and are received by a photoelectric diode which generates electrical pulses responsive thereto. The electrical pulses are used to determine a distance of the object.

The known system, however, has a substantial drawback. In particular, because the infrared laser emits a beam of light along a narrow beam path, automatically detecting objects over a relatively wide area is not possible. For example, if the known system were mounted in an automotive vehicle, objects in front of an automotive vehicle on a roadway that are outside of the narrow beam path would not be detected and thus their distance could not be calculated.

Another known laser range finding apparatus is disclosed in U.S. Pat. No. 5,949,530. The apparatus utilizes a laser to transmit a light pulse to relatively large reflectors that reflect the light pulse toward an object. The apparatus, however, requires relatively large reflectors which cannot be packaged in relatively small package spaces. Accordingly, vehicle designers would have extreme difficulty in utilizing such an apparatus in an automotive vehicle where only small packaging spaces would be available.

The inventors herein have recognized that there is a need for a system and method that minimizes or reduces one or more of the above-mentioned deficiencies.

SUMMARY OF INVENTION

The system for determining a distance of an object in accordance with a first aspect of the present invention is provided. The system includes a light source generating a light pulse at a first time. The system further includes a polymeric light reflector receiving the light pulse and reflecting the light pulse. The system further includes a light detector configured to receive at least a portion of the light pulse reflected off the object at a second time. Finally, the system includes a controller operably connected to the light source and the light detector. The controller is configured to determine a distance of the object based on a time difference between substantially the first and second times.

A method for determining a distance of an object in accordance with a second aspect of the present invention is provided. The method includes transmitting a light pulse to a polymeric light reflector at a first time. The method further includes reflecting the light pulse from the reflector. The method further includes receiving a portion of the light pulse reflected from the object at a second time. Finally, the method includes determining a distance of the object based on a time difference between substantially the first and second times.

A method for determining a distance of an object in accordance with a third aspect of the present invention is provided. The method includes transmitting a plurality of light pulses to a polymeric light reflector. The method further includes reflecting the light pulses from the reflector. The method further includes receiving the light pulses reflected off the object using a light detector. The method further includes determining an average travel time of the plurality of pulses propagating from the light reflector to the object and then to the light detector. Finally, the method includes determining a distance of the object based on the average travel time.

The system and methods for determining a distance of an object represent a significant improvement over conventional systems and methods. In particular, the system may be packaged in a relatively small package space since the polymeric light reflector is extremely thin as compared with conventional reflectors and lenses. Accordingly, the inventive system may be located in a relatively large number of locations in an automotive vehicle. Further, the polymeric light reflector provides a wider beam path—as compared to a narrow beam path transmitted directly from a laser—that can illuminate a roadway for automatically determining a distance of objects on the roadway.

These and other features and advantages of this invention will become apparent to one skilled in the art from the following detailed description and the accompanying drawings illustrating features of this invention by way of example.

BRIEF DESCRIPTION OF DRAWINGS

FIG. 3 is a front view of the polymeric light reflector of FIG. 2.

FIG. 4 is an enlarged fragmentary sectional view of the polymeric light reflector of FIG. 2 taken along lines 4—4.

FIG. 5 is an enlarged fragmentary sectional view of the polymeric light reflector of FIG. 2 taken along lines 5—5.

DETAILED DESCRIPTION

Figure 1:
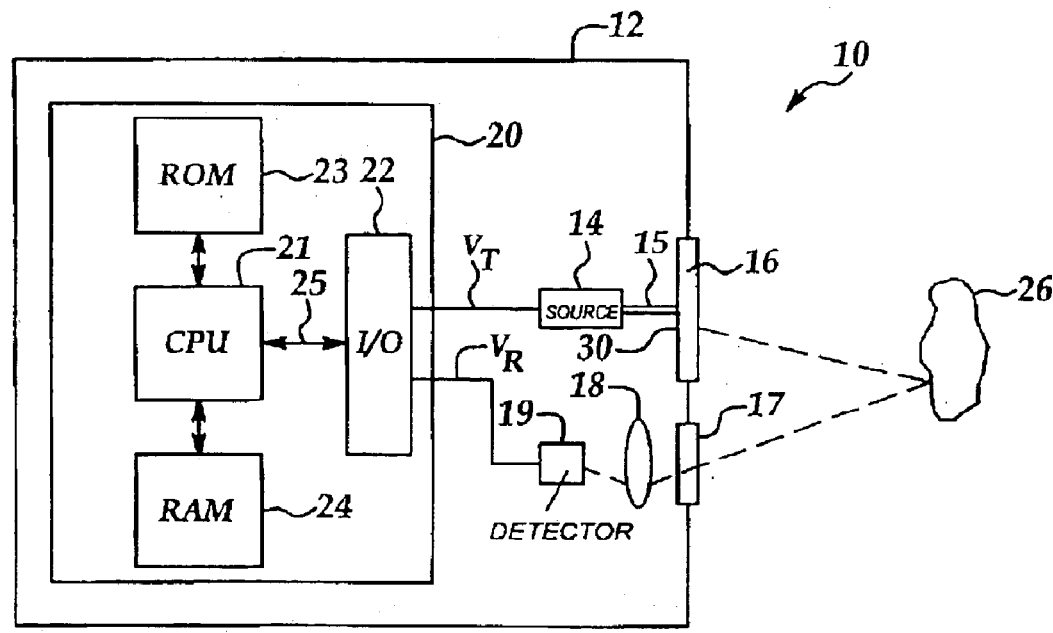
FIG. 1 is a schematic of a system for determining a distance of an object in accordance with a first aspect of the present invention.

Referring now to the drawings wherein like reference numerals are used to identify identical components in the various views, FIG. 1 illustrates a system 10 for determining a distance of an object 26. System 10 may be utilized in a plurality of applications where the distance of an object is desired. For example, system 10 may be used in an automotive vehicle (not shown) to detect the distance of objects on a roadway from a vehicle.

As illustrated, system 10 includes a housing 12 which can hold the remaining components of system 10. It should be understood, however, that the components of system 10 contained in housing 12 could be disposed at different locations wherein housing 12 would not be needed. For example, the components of system 10 could be disposed at different operative locations in the automotive vehicle so that a single housing 12 would be unnecessary.

System 10 further includes a light source 14, a fiber optic cable 15, a light reflector 16, a narrow-band optical filter 17, a focusing lens 18, a light detector 19, and a controller 20.

Light source 14 is provided to generate one or more light pulses to illuminate the environment and objects in the environment. The light pulses can either be in the visible light spectrum or the non-visible light spectrum. For purposes of discussion below, the light pulse may comprise a near infrared (NIR) light pulse, whose wavelength is in the 700–1500 nm range. Further, light source 14 may comprise a NIR diode laser. In alternate embodiments, however, light source could comprise other devices capable of emitting relatively short duration light pulses having a pulse duration of 10–100 ns for example.

As illustrated, light source 14 receives one or more voltage pulses ($V_T$) from controller 20 and generates an infrared light pulse responsive thereto. In particular, light source 14 may comprise a Single Stripe Diode Laser, Model No. S-81-3000-C-200-H manufactured by Coherent, Inc. of Santa Clara, Calif. As illustrated, light source 14 may be disposed in housing 12. Further, light source 14 may be connected to a first end of fiber optic cable 15 using a conventional light coupler (not shown) as known by those skilled in the art. The second end of fiber optic cable 15 is operatively disposed adjacent to polymeric light reflector 16.

Fiber optic cable 15 is utilized to transmit light from light source 14 to polymeric light reflector 16. Because of the high brightness (candela per unit area) of light source 14, cable 15 preferably is a relatively small diameter (0.1–1.0 mm) glass fiber. The use of a small diameter glass fiber provides several benefits over monofilament plastic pipes and glass fiber bundles used in non-laser based remote lighting systems. A small diameter glass fiber is less bulky than plastic pipes or glass fiber bundles that typically are 10–12 mm in diameter. Further, a small diameter glass fiber is significantly less expensive than monofilament plastic pipes or glass fiber bundles. Still further, a small diameter glass fiber is easier to package, handle, and to install than monofilament plastic pipes or glass fiber bundles.

Figure 2:
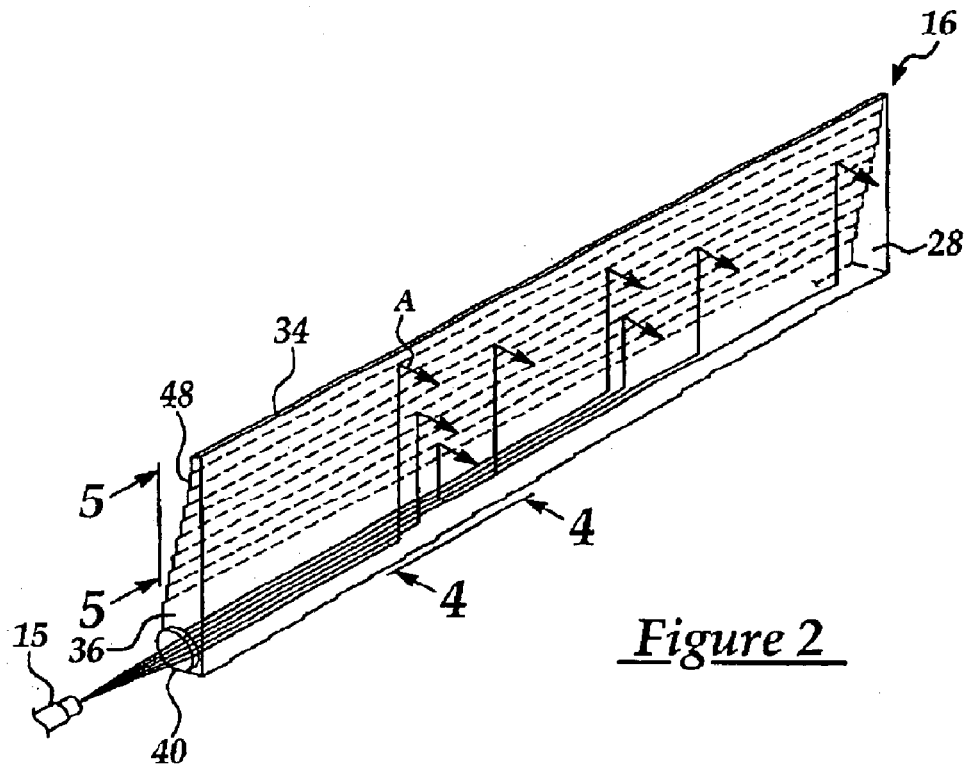
FIG. 2 is a perspective view of a polymeric light reflector utilized in the system of FIG. 1.
Figure 6:
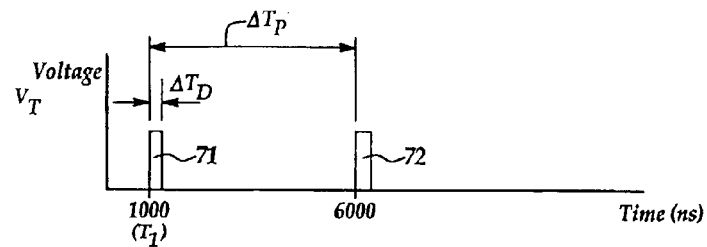
FIG. 6 is a signal schematic of control signals for inducing a diode laser to generate near infrared (NIR) light pulses.

Light reflector 16 is provided to reflect and expand light (represented by arrows A) generated by light source 14 generally in a first direction from reflector 16. In a preferred embodiment, shown in FIGS. 2 and 3, reflector 16 comprises a unitary sheet of optical material extending generally along a first axis 27. Reflector 16 preferably has a thickness range from 3–9 mm. It should be understood, however, that reflector 16 may have a thickness less than 3 mm or greater than 9 mm. Reflector 16 is preferably constructed from a transparent, solid piece of plastic such as polycarbonate and utilizes the principle of total internal reflection (TIR) to reflect light. TIR is explained in more detail hereinbelow. Reflector 16 may also be constructed from other transparent materials such as acrylics. Referring to FIGS. 1, 2 and 3, reflector 16 includes a front surface 28, a back surface 30, a bottom surface 32, a top surface 34, side surfaces 36, 38, and an aspheric lens 40.

Referring to FIGS. 3 and 4, bottom surface 32 of reflector 16 defines a first plurality of reflective steps 42 extending generally along the axial length of reflector 16. Each of reflective steps 42 includes a reflective facet 44 and a tread portion 46. As illustrated, each tread portion 46 is generally parallel to axis 27. Each reflective facet 44 is oriented at approximately a 45° angle relative to the adjacent tread portion 46. It should be understood, however, that the angle of each reflective facet 44 may vary depending upon the critical angle (discussed further hereinbelow) of respective facet 44. Further, reflective facet 44 may have a curved shape (not shown) to further direct the light in a desired direction. Still further, the number of reflective steps 42 may vary, and correspondingly, the number of reflective facets 44 may vary.

Reflective facets 44 utilize the principle of TIR to reflect light received from aspheric lens 40 towards reflective facets 50. Total internal reflection of the light occurs when the incident angle θ exceeds the critical angle $θ_C$ given by the equation $θ_C=\sin-1(n_1/n_2)$ wherein $n_1$ is the index of a refraction of air and $n_2$ is the index of a-refraction of the polymeric material used to construct reflector 16. In an alternate embodiment (not shown), reflective facets 44 can be metalized if the light strikes facets 44 at an angle less than the critical angle.

Referring to FIGS. 1, 2 and 5, back surface 30 defines a second plurality of reflective steps 48 extending generally perpendicular to axis 27. Each of reflective steps 48 includes a reflective facet 50 and a tread portion 52. As illustrated, each tread portion 52 is generally perpendicular to axis 27 and parallel to front surface 28. Each reflective facet 50 is oriented at approximately a 45° angle relative to the adjacent tread portion 52. It should be understood, however, that the angle of each reflective facet 50 may vary depending upon the critical angle of respective facet 50. Further, each reflective facet 50 may have a curved shape (not shown) to further direct the light in a desired direction. Still further, the number of reflective steps 48 may vary, and correspondingly, the number of reflective facets 50 may vary. Referring to FIGS. 4 and 5, facets 50 are aligned to receive light reflected from one or more reflective facets 44, and, like facets 44, utilize the principle of TIR. Facets 50 reflect the received light through the front surface 28 of reflector 16 as will be described in further detail hereinafter. In an alternate embodiment (not shown), reflective facets 50 can be metalized if the light from reflective facets 44 strikes facets 50 at an angle less than the critical angle.

Referring to FIG. 2, aspheric lens 40 is provided to collimate the light exiting fiber optic cable 15. The axial distance between cable 15 and lens 40 is chosen such that the light diverging from cable 15 fills the aperture of lens 40. Lens 40 is preferably constructed to have a surface of revolution about axis 27 with a circular or hyperbolic cross section. As illustrated, element 40 is disposed on side surface 36 of reflector 16 and may be integral with reflector 16. In an alternate embodiment of reflector 16, lens 40 may comprise a separate lens disposed in operative proximity to reflector 16.

Referring to FIGS. 1 and 2, the light pulses generated by light source 14 are received by reflector 16 from the second end of fiber optic cable 15. The light being emitted from the second end of cable 15 preferably has a spread angle between 20–50°. It should be understood, however, that the spread angle may be less than 20° or greater than 50° depending upon the light characteristics of cable 15. The emitted light enters reflector 16 through aspheric lens 40 disposed on the side surface 36 of reflector 16. As discussed previously, element 40 collimates the light, which then propagates toward reflective facets 44. Reflective facets 50 receive the light reflected from facets 44 and further reflect the light through the front surface 28 of reflector 16 generally in a first direction toward an object 26.

In an alternate embodiment of system 10, light reflector 16 could be replaced by a fan-shaped reflector described in commonly owned U.S. Pat. No. 6,422,713, which is incorporated by reference herein in its entirety. In this alternate embodiment, light source 14 could be directly coupled to the fan-shaped reflector. Thus, fiber optic cable 15 would not be needed.

Narrow-band optical filter 17 is provided to allow light at a wavelength substantially equal to the wavelength of light generated by light source 14 to pass therethrough. For example, when NIR light pulses are generated by light source 14, filter 17 allows only light within the NIR emission spectrum of the light source to pass therethrough and be received by light detector 19. In this case, filter 17 would prevent saturation of detector 19 by visible light emitted from the head lamps (not shown) of other automotive vehicles. Filter 17 is conventional in the art and is preferably disposed proximate focusing lens 18.

Focusing lens 18 is provided to focus NIR light pulses passing through filter 17 onto light detector 19. Lens 18 may comprise an aspherical lens, a doublet lens, or a triplet lens and can be constructed from optical glass or plastics such as that used in standard camera lenses.

Light detector 19 is provided to generate a signal ($V_R$) responsive to each reflected light pulse received by detector 19. Detector 19 may comprise a photodiode having a 1.0 nanosecond (ns) response time. Signal ($V_R$) has an amplitude that is indicative of a power level or intensity of a received light pulse and is received by controller 20.

Controller 20 is provided to implement the methods for determining a distance of an object. Controller 20 includes a central processing unit (CPU) 21, input/output ports 22, read-only memory (ROM) 23 or any suitable electronic storage medium containing processor-executable instructions and calibration values, random-access memory (RAM) 24, and a data bus 25 of any suitable configuration. Controller 20 generates voltage pulses ($V_T$) for generating light pulses and receives the voltage signals ($V_R$) corresponding to received portions of the light pulses, as explained in greater detail below.

Figure 13:
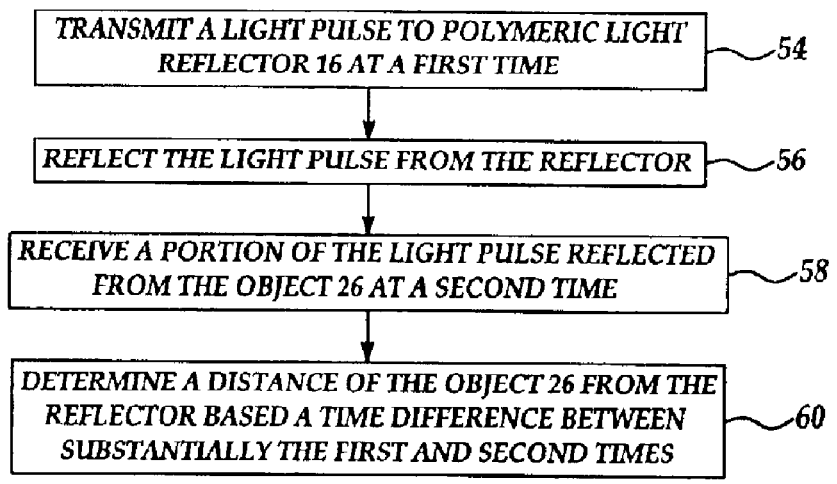
FIG. 13 is a flowchart of a method for determining a distance of an object in accordance with a second aspect of the present invention.

Referring to FIG. 13, a method for determining a distance of an object in accordance with a second aspect of the present invention will now be described.

At step 54, a light pulse from NIR diode laser 14 is transmitted to light reflector 16. As discussed above, controller 20 can generate a voltage pulse 71 to induce light source 14 to generate a corresponding light pulse. The voltage pulse 71 can have a duration ($\Delta T_D$) of 10–40 ns, for example. Controller 20 can store the time ($T_1$) when the pulse was transmitted in RAM 24.

Next at step 56, light reflector 16 reflects the NIR pulse generally in a first direction from reflector 16. Reflector 16 may be configured to provide a horizontal light spread of 4–5 degrees and a vertical light spread of 1–2 degrees. As shown in FIG. 1, the light pulse can propagate to an object 26 and be reflected from object 26.

Figure 7:
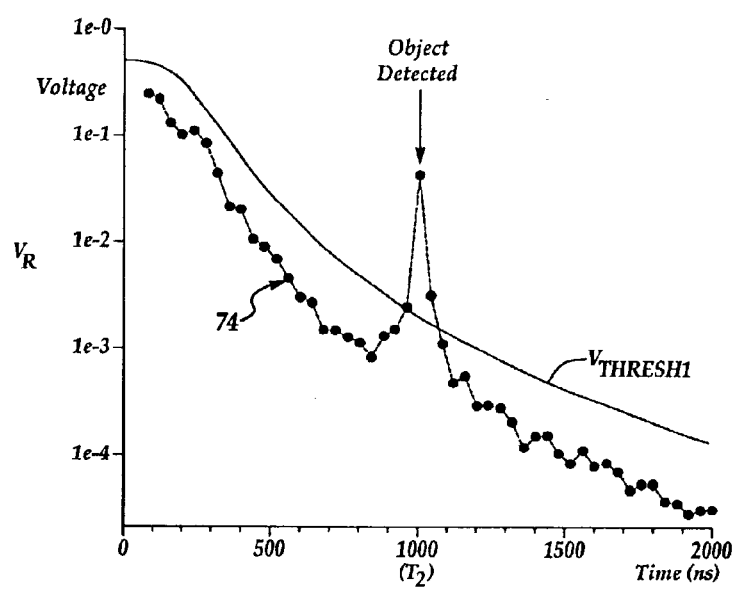
FIG. 7 is a schematic of a waveform generated from a NIR light pulse reflection and a threshold used to detect an object.

Next at step 58, the light pulse reflected off object 26 can be received by infrared light detector 19 which generates a voltage signal ($V_R$) based on the power level or intensity of the light pulse. In particular, the amplitude of signal ($V_R$) is proportional to the power level or intensity of the light pulse. Referring to FIG. 7, waveform 74 generated by voltage signals ($V_R$) over a monitoring period of 2000 ns (after transmission of the light pulse) is illustrated.

Next at step 60, controller 20 can determine a distance of object 26 based on a time interval from a time ($T_1$) when the infrared light pulse is transmitted to a time ($T_2$) when the light pulse reflected off object 26 is received by light detector 19.

Referring again to FIG. 7, the substeps of step 60 will now be explained in greater detail. Controller 20 can sample the voltage ($V_R$) generated by light detector 19 over time using I/O ports 22. For example, controller 20 can sample the voltage ($V_R$) every 40 ns over a monitoring time period of 2000 ns. Each of the sampled values of voltage ($V_R$) can be stored in RAM 24 of controller 20. The plurality of stored values of voltage ($V_R$) over the monitoring time period defines received waveform 74—comprising a set of points illustrated in FIG. 7.

Once waveform 74 is obtained, one of two methods can be utilized to detect object 26. Referring to FIG. 7, a first method compares an amplitude of each point of waveform 74 to a threshold ($V_{THRESH1}$) to determine when an object 26 is detected. As shown, the threshold ($V_{THRESH1}$) is decreased over an elapsed time of 2000 ns. The threshold ($V_{THRESH1}$) is decreased because the transmitted light and reflected light pulses decrease in signal strength by the square of the distance traveled, which leads to a return signal for relatively distant objects being proportional to (1/Td'), where $T_d$ (i.e., $T_d = T_2 - T_1$) is the total travel time of the light pulse. The predetermined threshold ($V_{THRESH1}$) may be defined using the following equation:

$$VTHRESH1 = \frac{1}{A + B * Td^2 + C * Td^4}$$

where

A = predetermined constant having units of $$\frac{1}{\text{voltage}}$$

B = predetermined constant having units of $$\frac{1}{\text{voltage} * \text{seconds}^2}$$

C=predetermined constant having units of $$\frac{1}{\text{voltage} * \text{seconds}^4}$$

The constants A, B, C may be empirically determined and depend on the sensitivity of detector 19, the field of view of detector 19, the transmission power of light source 14, and the shape, size, and reflective characteristics of the objects to be detected.

By decreasing the threshold ($V_{THRESH1}$) over the monitoring period, the sensitivity of system 10 is increased for detecting relatively distant objects that would have a reflection with a relatively small amplitude. Further, the sensitivity of system 10 to fog is decreased by having a relatively high threshold value for relatively small elapsed travel times (e.g., 0–500 ns) of the light pulse. It should be understood, that the threshold ($V_{THRESH1}$) could be implemented using equations different from the Equation (1). For example, ($V_{THRESH1}$) could implemented using an equation that: (i) decreases ($V_{THRESH1}$) in a stepwise manner (with two or more steps) over time, or (ii) decreases ($V_{THRESH1}$) substantially linearly.

Figure 8:
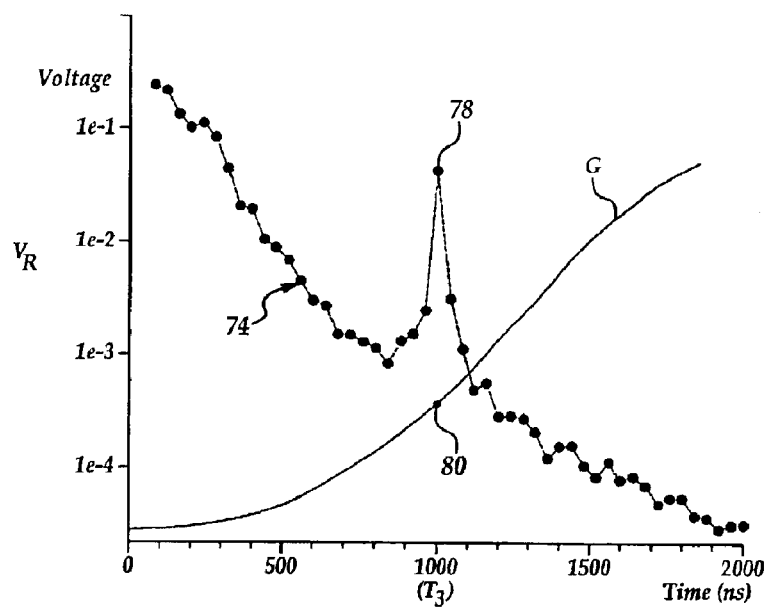
FIG. 8 is a schematic of a waveform generated from a NIR light reflection and a signal gain.
Figure 9:
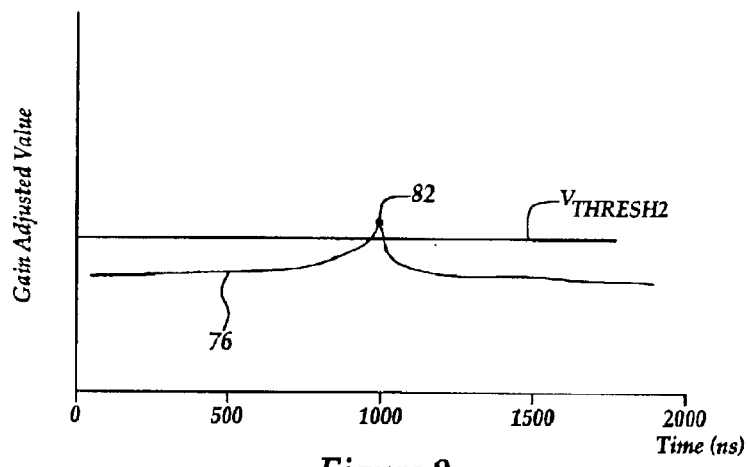
FIG. 9 is a schematic of a resultant signal generated from the waveform and gain of FIG. 8 and a threshold used to detect an object.

Referring to FIGS. 8, 9, a second method for detecting an object 26 is graphically illustrated. As shown, waveform 74 is obtained from portions of a received light pulse as described above. Further, a signal gain (G) is illustrated that increases over an elapsed time (or travel time) of a light pulse. Controller 20 can multiply the amplitude of each point of waveform 74 at a predetermined elapsed time by a corresponding signal gain value to obtain a gain-adjusted value. For example, the amplitude of waveform 74 at time T=1000 ns (value 78) can be multiplied by gain value 80 to obtain the gain-adjusted value 82. When the gain adjusted value is greater than a predetermined threshold ($V_{THRESH2}$), controller 20 indicates object 26 is detected. Thus, by increasing the gain (G) over the elapsed monitoring time, the sensitivity of system 10 is increased for detecting relatively distant objects that would have a return light pulse with a relatively small amplitude.

The gain (G) may be defined by the following equation:

$$G = D + E*Td^2 + F*Td^4$$

where:
D=predetermined dimensionless constant;
E=predetermined constant having units of (seconds)$^{-2}$
F=predetermined constant having units of (seconds)$^{-4}$ The constants D, E, F in Equation (2) may be empirically determined and depend on the sensitivity of detector 19, the field of view of detector 19, the transmission power of light source 14, and the shape, size and reflective characteristics of the objects to be detected. It should be understood, however, that gain (G) could be defined by equations different from the foregoing equation. For example, (G) could defined by an equation that: (i) increases gain(G) in a stepwise manner (with two or more steps) over time, or (ii) increases gain (G) substantially linearly.

After the object 26 has been detected by step 60, step 60 determines a distance of object 26 based on a time difference between time ($T_1$) when the light pulse is transmitted and time ($T_2$) when the light pulse reflected from object 26 is received by light detector 19. In particular, a distance value (DIST) can be calculated using the following equation:

$$DIST = C(T_2 - T_1)$$

where C=speed of light (3.0E 8 meters/second).

Figure 14:
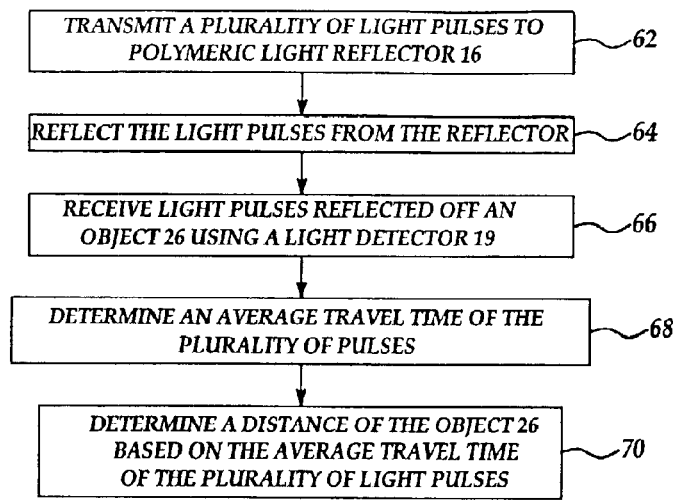
FIG. 14 is a flowchart of a method for determining a distance of an object in accordance with a third aspect of the present invention.

Referring to FIG. 14, a method for determining a distance of an object in accordance with a third aspect of the present invention will now be described.

At step 62, a plurality of light pulses from NIR diode laser 14 are transmitted to polymeric light reflector 16. As discussed above, controller 20 can generate a plurality of voltage pulses ($V_T$), such as pulses 71, 72 to induce light source 14 to generate the NIR light pulses that are transmitted to light reflector 16. Although only two pulses 71, 72 are shown, controller 20 can generate as many pulses as needed to obtain a desired signal-to-noise ratio. The voltage pulses 71, 72 can each have a duration of 10–40 nanoseconds with a repetition frequency of 100–500 kHz. The repetition frequency is defined as $1/\Delta T_p$, (where $\Delta T_p$ is the time duration between light pulses) and determines the maximum detection range of the system. For example, if the repetition frequency is 100 kHz, the system 10 would have a maximum detection range of 1500 meters (e.g., detection range=3.0E8/100,000/2) where 3.0E8 meters/second is the speed of light. Alternately, at a repetition frequency of 500 kHz, system 10 would have a maximum detection range of 300 meters.

Next at step 64, light reflector 16 can reflect the light pulses outwardly. As discussed above, reflector 16 may be configured to provide a horizontal light spread of 4–5 degrees and a vertical light spread of 1–2 degrees to illuminate the width of a roadway. The light pulses can then propagate to an object 26 and be reflected from object 26.

Next at step 66, the light pulses reflected off object 26 can be received by light detector 19 which generates a plurality of voltage signals ($V_R$) based on the power level or intensity of the received light pulses. The data values for each of the received waveforms generated by each of the pulses, respectively, can be stored in RAM 24 of controller 20. For example, referring to FIG. 10, the data values for waveform 84 produced from reflected light from pulse 71 can be stored in RAM 24. Similarly, the data points for waveform 86, produced from reflected light from pulse 72 can be stored in RAM 24. Thereafter, controller 20 can generate a plurality of data values defining a waveform 88 in which each data value of waveform 88 corresponds to an average value of data values in waveforms 84, 86. For example, data value 90 of waveform 88 may correspond to the average value of data values 94, 92 of waveforms 84, 86 respectively, which are aligned in a common time interval.

Figure 10:
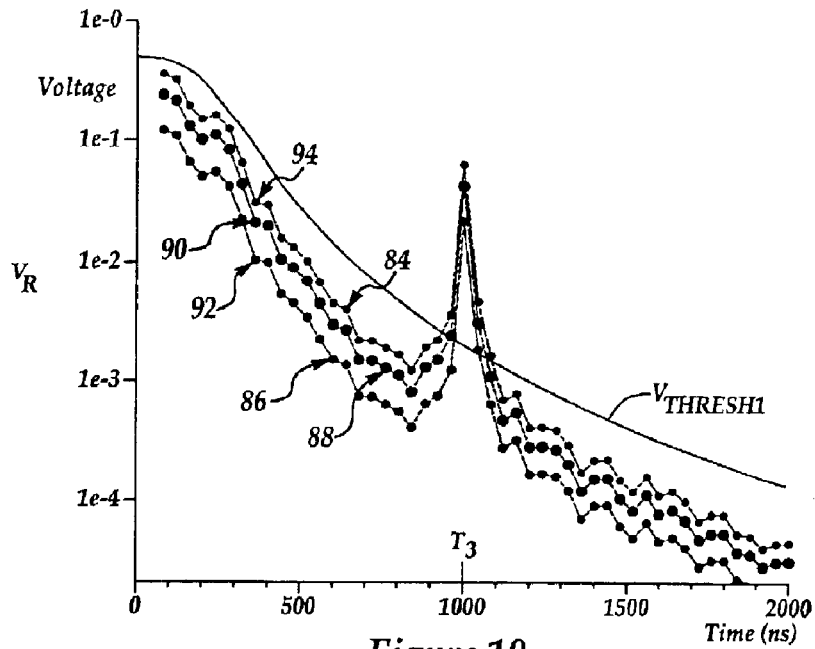
FIG. 10 is a schematic of an averaged waveform generated from two NIR light pulse reflections and a threshold used to detect an object.

Referring to FIG. 10, although only two waveforms 84, 86 generated from two light pulse reflections are shown, it should be understood that controller 20 could produce an averaged waveform from more than two waveforms. For example, controller 20 could average 2000 waveforms—generated by 2000 light pulses having a repetition rate of 200 kHz—to obtain an averaged waveform 88 every 10 milliseconds.

Once averaged waveform 88 is obtained, one of two methods can be utilized to detect object 26. Referring to FIG. 10, a first method compares waveform 88 to threshold ($V_{THRESH1}$). The characteristics of threshold ($V_{THRESH1}$) were discussed above. When the averaged waveform 88 has a voltage value greater than the threshold ($V_{THRESH1}$), controller 20 indicates object 26 is detected.

Figure 11:
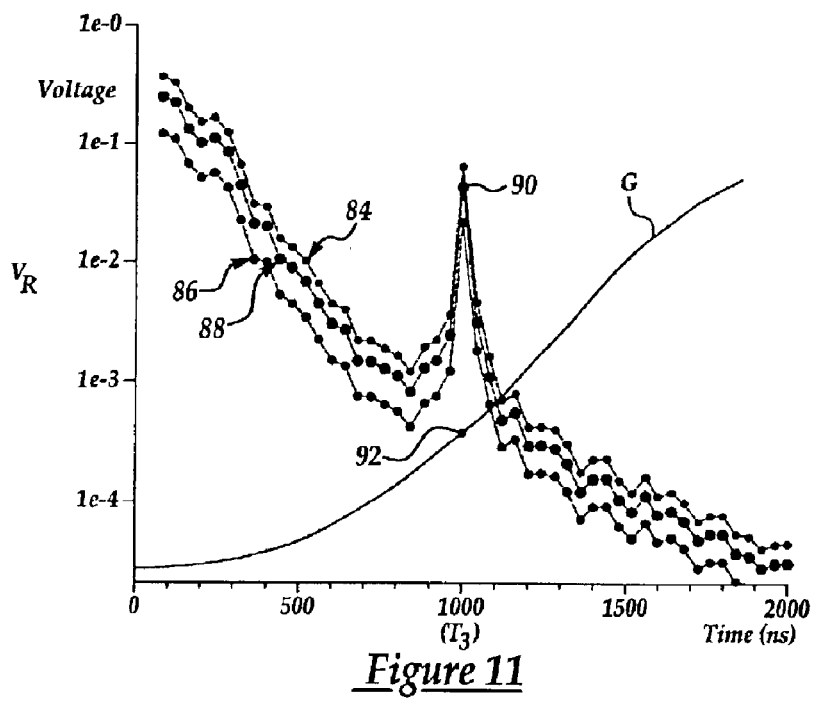
FIG. 11 is a schematic of an averaged waveform generated from two NIR light pulse reflections and a signal gain.
Figure 12:
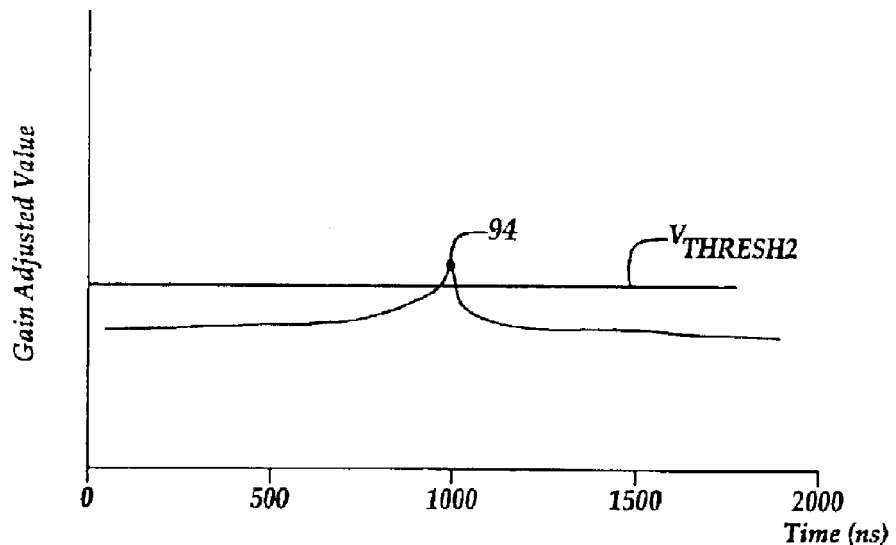
FIG. 12 is a schematic of a resultant signal generated from the waveform and gain of FIG. 11 and a threshold used to detect an object.

Referring to FIGS. 11 and 12, a second method for detecting an object 26 is graphically illustrated. Controller 20 can multiply an amplitude of each point of waveform 88 at a predetermined elapsed time by a corresponding signal gain value to obtain a gain-adjusted value. For example, the amplitude of waveform 88 at time T=1000 ns (value 90) is multiplied by gain value 92 to obtain the gain-adjusted value 94. When the gain adjusted value 94 is greater than a predetermined threshold ($V_{THRESH2}$), controller 20 indicates object 26 is detected at that time. The detection time is designated as time ($T_3$). As shown in FIG. 11, the average travel time for the NIR pulses 71, 72 is approximately 1000 ns.

When controller 20 determines detection time ($T_3$) when object 26 is detected, controller 20 can calculate the average travel time ($T_{AVG}$) of the pulses 71, 72 using the following equation:

$$TAVG=(T3-T1)$$

Referring to FIG. 14, at step 70, controller 20 can calculate a distance value (DIST) indicative of the distance of object 26 based on an average travel time of the light pulses using waveform 88. In particular, the distance value (DIST) can be calculated using the following equation:

$$DIST=C(TAVG)$$

where C=speed of light.

The system 10 and the methods for determining a distance of an object represent a significant improvement over conventional systems and methods. In particular, system 10 may be packaged in a relatively small volume since the polymeric light reflector is extremely thin as compared with conventional reflectors and lenses. Accordingly, the inventive system may be readily located in relatively large number of locations in an automotive vehicle. Further, the polymeric light reflector can spread the light pulses along a wider beam path to illuminate a width of a roadway as opposed to spot illumination by conventional lasers. Thus, system 10 is able to automatically determine a distance of object that would be undetectable by known systems.

We claim:

1. A system for determining a distance to an object, comprising:
    a light source generating a light pulse at a first time;
    a polymeric light reflector receiving said light pulse and reflecting said light pulse;
    a light detector configured to receive at least a portion of said light pulse reflected off the object, said portion being received at a second time; and,
    a controller operably connected to said light source and said light detector, said controller configured to determine a distance of the object based on a time difference between said first and second times.

2. The system of claim 1 wherein said light source comprises a near-infrared light source.

3. The system of claim 1 wherein said polymeric light reflector includes a first and second plurality of reflective facets, said first plurality of reflective facets receiving said light pulse from said light source and reflecting said light pulse to a second plurality of reflective facets that further reflect said light pulse toward the object.

4. The system of claim 1 wherein said polymeric light reflector includes a transparent portion and a reflective surface, said light pulse moving through said transparent portion to said reflective surface, said surface reflecting said light pulse toward the object.

5. The system of claim 1 wherein said light detector comprises a near-infrared light detector.

6. The system of claim 1 wherein said controller is further configured to generate a received waveform based on said received light pulse, said controller being further configured to indicate the object is detected when any portion of said waveform has an amplitude greater than a predetermined threshold at said second time.

7. The system of claim 6 wherein said predetermined threshold has a first value at a first elapsed time after said transmission and a second value at a second elapsed time, said second elapsed time being after said first elapsed time, said second value being less than said first value.

8. The system of claim 1 wherein said controller is further configured to generate a received waveform based on said received light pulse, said controller being further configured to multiply an amplitude of said received waveform by a gain value to obtain a gain adjusted value, said controller being further configured to indicate the object is detected when said gain adjusted value is greater than a predetermined threshold at said second time.

9. An article of manufacture, comprising:
    a computer storage medium having a computer program encoded therein for determining a distance of an object, said computer storage medium comprising:
    code for inducing a light source to emit a light pulse at a first time that is reflected by a polymeric light reflector toward an object;
    code for storing values indicative of a received portion of said light pulse reflected from the object at a second time; and,
    code for calculating a distance of the object from said reflector based on a time difference between said first and second times.

10. A method for determining a distance to an object disposed in an environment, comprising:
    transmitting a light pulse to a polymeric light reflector at a first time;
    reflecting said light pulse from said reflector;
    receiving a portion of said light pulse reflected from said object, said portion being received at a second time; and,
    determining a distance of said object based on a time difference between said first and second times.

11. The method of claim 10 wherein said reflecting step includes:
    reflecting said light pulse from a first reflective surface in said reflector to a second reflective surface in said reflector; and,
    reflecting said light pulse outwardly from said second reflective surface.

12. The method of claim 11 wherein the step of reflecting said light pulse from a first reflective surface includes reflecting said light pulse to illuminate a width of a roadway.

13. The method of claim 10 wherein said determining step includes:
    generating a received waveform based on said received light pulse;
    indicating the object is detected when any portion of said waveform has an amplitude greater than a predetermined threshold at said second time; and,
    calculating said distance based on said time difference between said first and second times.

14. The method of claim 13 wherein said predetermined threshold has a first value at a first elapsed time after said transmission and a second value at a second elapsed time, said second elapsed time being after said first elapsed time, said second value being less than said first value.

15. The method of claim 10 wherein said determining step includes:
    generating a received waveform based on said received light pulse;

multiplying an amplitude of said received waveform by a gain value to obtain a gain adjusted value; and, indicating said object is detected when said gain adjusted value is greater than a predetermined threshold at said second time; and, calculating said distance based on said time difference between said first and second times.

16. The method of claim 10 wherein said light pulse comprises a near-infrared light pulse.

17. The method of claim 10 wherein the time difference is an average time difference.

18. A method for determining distance from an object, comprising:

transmitting a plurality of light pulses to a polymeric light reflector;

reflecting said light pulses from said reflector;

receiving said light pulses reflected off said object using a light detector;

determining an average travel time of said plurality of pulses; and, determining a distance of said object based on said average travel time.

19. The method of claim 18 wherein said step of determining an average travel time includes:

generating a plurality of received waveforms responsive to said light pulses received by said light detector;

aligning said plurality of received waveforms in a common time interval;

determining an averaged received waveform by averaging said plurality of received waveforms over said common time interval; and, calculating said average travel time of said light pulses based on said averaged received waveform.

20. The method of claim 18 wherein said plurality of light pulses comprises a plurality of near-infrared light pulses.

21. A method for determining distance to an object disposed in an environment, the method comprising:

transmitting a plurality of light pulses to a polymeric reflector that directs at least a portion of the light pulses to illuminate the environment;

receiving reflected light pulses from the environment;

detecting the object based on elapsed time from transmitting the light pulses and intensity of the reflected light pulses; and determining distance to the object based on a time difference between transmitting the light pulses and detecting the object.

22. The method of claim 21 wherein the step of detecting comprises comparing a waveform based on the received reflected light pulses to a threshold that decreases as elapsed time increases.

23. The method of claim 22 wherein the threshold decreases in a stepwise manner.

24. The method of claim 21 wherein the step of detecting comprises:

generating a waveform based on the received reflected light pulses and a gain that increases as elapsed time increases; and comparing the waveform to a constant threshold.

25. The method of claim 21 wherein the step of determining distance comprises determining distance based o&an average time difference between transmitting the light pulses and detecting the object.

26. The method of claim 21 wherein the polymeric reflector comprises a transparent thin sheet optical element.

* * * * *